H. E. BRADLEY.
DRILL SOCKET.
APPLICATION FILED NOV. 30, 1908.
926,845.
Patented July 6, 1909.
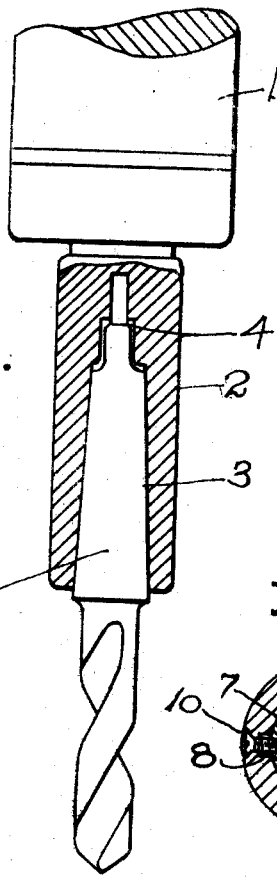
Fig.1.
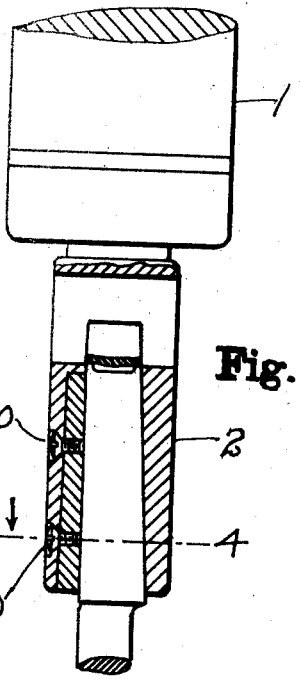
Fig.2.
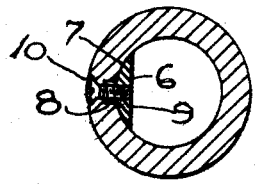
Fig.4.
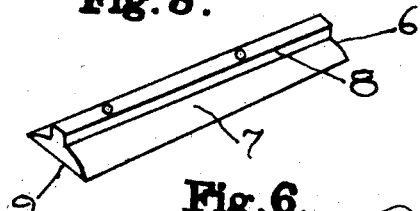
Fig.3.
Fig.7.
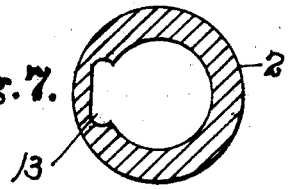
Fig.6.
Fig.8.
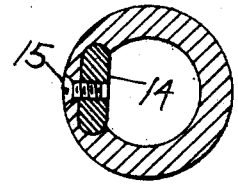
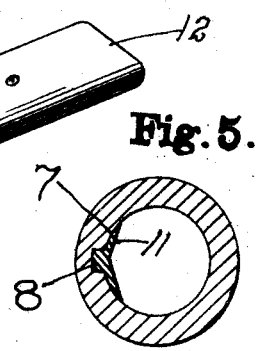
Fig.5.
WITNESSES
Willard H. Bardsley.
E. I. Ogden.
INVENTOR
HAROLD E. BRADLEY.
BY Howard E Barlow
ATTORNEY

UNITED STATES PATENT OFFICE.

HAROLD E. BRADLEY, OF GREENWOOD, RHODE ISLAND, ASSIGNOR TO MORSE TWIST DRILL & MACHINE COMPANY, OF NEW BEDFORD, MASSACHUSETTS, A CORPORATION.

DRILL-SOCKET.

No. 926,845.  Specification of Letters Patent.  Patented July 6, 1909.

Application filed November 30, 1908.  Serial No. 465,066.

*To all whom it may concern:*

Be it known that I, HAROLD E. BRADLEY, a citizen of the United States, residing at Greenwood, in the county of Kent and State of Rhode Island, have invented certain new and useful Improvements in Drill-Sockets, of which the following is a specification, reference being had therein to the accompanying drawing.

This invention pertains to drill sockets of the class adapted to receive and retain the tapered shank of a drill or cutter, such for instance as twist drills, milling cutters, and similarly operated tools, and the object of the invention is to provide a drill socket or collet which in addition to performing its regular function, which is that of driving the drill by means of its tang or flattened end, is also adapted to receive and drive a drill which has been disabled by having this tang portion broken off, thus being able to utilize drills which would otherwise be worthless.

In practice the tang or tongue that is formed on the end of the shank of the ordinary twist drill is flattened to fit into a corresponding slot or recess made to receive it in the bottom of the drill socket by which tang the drill is driven. When the drill is subjected to severe strains this tang often becomes twisted off rendering the drill, which is otherwise in good condition, worthless. In order to obviate this difficulty and be able to continue the use of these imperfect drills I have provided a driving key plate which is adapted to be readily inserted into the drill socket whereby by grinding off and flattening one side of the drill shank to correspond to the shape of the plate the drill may again be inserted into the socket and driven as well as before.

With these and other objects in view, the invention consists of certain novel features of construction, as will be more fully described and particularly pointed out in the appended claims.

In the accompanying drawings: Figure 1— is a view showing a drill applied to a drill socket, shown in section, the drill being arranged to be driven through its flattened end or tang. Fig. 2— is a sectional view of the drill socket showing the shank of the drill applied thereto with its tang broken off and the drill being driven by means of my improved key plate applied to the socket. Fig. 3— is a perspective view showing one of the key plates in detail. Fig. 4— is a section on line 4—4 of Fig. 2 through the socket showing the application of my key plate thereto. Fig. 5— is the same showing the driving face of the key plate formed on an angle. Fig. 6— is a perspective view illustrating a modified form of key plate provided with straight sides or faces. Fig. 7— illustrates the shape in cross section of an aperture in the drill socket adapted to receive said modified form of key plate, illustrated in Fig. 7. Fig. 8— is a section through the drill socket showing the modified form of key plate inserted therein.

Referring to the drawings 1 designates the spindle of a drilling machine or lathe in which the drill socket 2 is retained in the usual way. The ordinary drill socket is provided with a round tapering hole 3 the inner end of which is formed into an elongated slot 4 having flattened sides.

Drills and cutters, such as twist drills, milling cutters, and the like, are usually provided with a long tapering shank 5, the end of which is flattened to form a tang or tongue by means of which the same is driven, the tapered portion being adapted to fit closely into the corresponding hole in the drill socket and the tang or tongue is set up into its corresponding socket, which socket forms a wrench for turning the drill.

When the drill is subjected to an unusual strain this tang becomes twisted and oftentimes broken off, effectually preventing the drill from ever again being driven as originally designed. In order to further utilize this broken drill I have provided a key plate 6, see Figs. 3 and 4, one face 7 of which is adapted to conform to and fit close against the inner wall of the socket. The rounded surface of this plate is provided with a longitudinally arranged fin 8 adapted to fit into a corresponding recess in the wall of the socket. The outer face 9 of said plate is preferably formed flat so as to provide a bearing against which the flattened side of the drill shank is adapted to rest to prevent the same from turning in the socket. The face of this key plate may also be formed on an angle, as illustrated at 11 in Fig. 5, if desired. This key plate may be held in the socket in any desired manner, screws 10—10 being shown as one simple way of fastening the same.

In some classes of work it is found advantageous to form a substantially straight bodied key plate 12 and set the same into a corresponding recess 13 formed lengthwise in the wall of the socket 2 leaving but a small portion of the key plate 14 extending through the wall into the interior of the socket, which extending portion forms a stop against which the flattened side of the drill shank is adapted to rest to prevent the same from turning in the socket. This key plate may also be secured by screws 15, or other suitable means. This style of key plate is found to be very inexpensive in construction and effective in operation.

The essential feature of my improved device is that the key plate in any of its forms may be readily removed from the socket when it is desired to use the same for the reception of a new drill, and as soon as the tang or driving portion of the new drill for any reason becomes bent or broken the key plate is quickly inserted and secured in position in the socket, the side of the drill shank ground off an amount corresponding to the thickness of the plate when it can be again inserted into the socket and used as before.

In referring to my device as a drill socket, the same is not limited to the reception of drills alone, but may be used in the operation of cutters or other tools that are driven through the medium of a tapered shank.

By the employment of my improved device the drills and cutters may be entirely used up before being thrown away, while without its use, many dollars' worth of slightly damaged tools which for all practical purposes were as good as new were worthless because of the difficulty of using them.

Having thus described my invention, what I claim as new and desire to secure by Letters Patent, is:

1. A tool socket provided with a longitudinally slotted portion in its interior wall, a broad driving key plate one face of which is adapted to engage the circular face of the inner wall of said socket, means on said plate for engaging said slotted portion, the drill engaging face of said plate being flattened, whereby a drill having a flattened shank may be inserted into and driven by said socket, and means for removably attaching said plate in said socket.

2. A tool socket provided with a longitudinally slotted portion in its interior wall, a driving key plate provided with a face adapted to conform to and fit close against the circular face of the inner wall of the socket, the circular face of the key plate being provided with a longitudinal fin adapted to fit into said slotted portion, the opposite face of said plate being provided with a flattened surface, whereby a drill having a flattened shank may be inserted into and driven by said socket.

3. A tool socket provided with a longitudinally slotted portion in its interior wall, a driving key plate provided with a face adapted to conform to and fit close against the circular face of the inner wall of the socket, the circular face of the key plate being provided with a longitudinal fin formed integral therewith and adapted to fit into said slotted portion, the opposite face of said plate being provided with a flattened surface, whereby a drill having a flattened shank may be inserted into and driven by said socket, and means for removably attaching said plate in said socket.

4. A tool socket provided with a longitudinally slotted portion in its interior wall, a broad driving key plate one face of which is adapted to engage the circular face of the inner wall of said socket, means on said plate for engaging said slotted portion, the drill engaging portion of said plate being provided with a plurality of engaging surfaces whereby a tool having a shank with slightly flattened surfaces may be inserted into and driven by said socket, and means for removably attaching said plate in said socket.

In testimony whereof I affix my signature in presence of two witnesses.

HAROLD E. BRADLEY.

Witnesses:
  HOWARD E. BARLOW,
  WILLARD W. BARDSLEY.